(12) United States Patent
Xue et al.

(10) Patent No.: US 9,923,658 B2
(45) Date of Patent: Mar. 20, 2018

(54) INTERFERENCE CANCELATION

(71) Applicant: Intel Corporation, Santa Clara, CA (US)

(72) Inventors: Feng Xue, Redwood City, CA (US); Yang-Seok Choi, Portland, OR (US); Shilpa Talwar, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/581,219

(22) Filed: Dec. 23, 2014

(65) Prior Publication Data

US 2016/0182104 A1    Jun. 23, 2016

(51) Int. Cl.
  *H04B 1/44* (2006.01)
  *H04J 11/00* (2006.01)
  *H04B 1/525* (2015.01)

(52) U.S. Cl.
  CPC .......... *H04J 11/0056* (2013.01); *H04B 1/525* (2013.01)

(58) Field of Classification Search
  CPC . H04B 1/00; H04B 1/40; H04B 15/00; H04B 1/525; H04J 11/0056
  USPC ......................................................... 455/78
  See application file for complete search history.

(56) References Cited

U.S. PATENT DOCUMENTS

| | | | | |
|---|---|---|---|---|
| 2003/0012160 A1* | 1/2003 | Webster | .............. | H04L 25/0226 370/335 |
| 2012/0140860 A1* | 6/2012 | Rimini | ................... | H04B 1/525 375/350 |
| 2013/0044791 A1* | 2/2013 | Rimini | ................... | H04B 1/109 375/219 |
| 2013/0166259 A1* | 6/2013 | Weber | ................. | G06F 17/5009 703/2 |
| 2016/0072649 A1* | 3/2016 | Tu | ............................. | G06N 3/04 375/346 |

FOREIGN PATENT DOCUMENTS

| | | |
|---|---|---|
| CN | 101047439 A | 10/2007 |
| CN | 101471912 A | 7/2009 |
| CN | 103947106 A | 7/2014 |
| CN | 103986482 A | 8/2014 |

OTHER PUBLICATIONS

Office Action dated Sep. 12, 2016 for Taiwanse Patent Application No. 104138132 (with English translation).
Office Action dated Aug. 31, 2017 for Chinese Patent Application No. 201510816314.3.

* cited by examiner

*Primary Examiner* — Nay A Maung
*Assistant Examiner* — Angelica M Perez
(74) *Attorney, Agent, or Firm* — Schiff Hardin LLP

(57) ABSTRACT

A method and system for interference cancellation in a wireless communication device. The wireless communication device can include an interference estimator configured to generate one or more filter weights based on a transmit signal. The one or more filter weights can be generated based on one or more kernels generated by the interference estimator. The interference estimator can be configured to perform recursive linear square (RLS) estimations based on the one or more kernels. The RLS estimations can include one or more independent RLS estimations, one or more parallel RLS estimations and/or one or more cascade RLS estimations. The interference estimator can be configured to perform one or more orthogonally transform one or more kernels.

22 Claims, 5 Drawing Sheets

INTERFERENCE CANCELATION

BACKGROUND

Field

Aspects described herein generally relate to interference cancellation, including self-interference cancellation of a receive signal.

Related Art

Communication signals, including wireless communication signals, can experience interference from one or more external and/or internal sources. In full-duplex communication systems, the transmit communication path can interfere with the receive communication path if the two paths are not properly and/or sufficiently isolated. Conventional full-duplex communication systems can utilize, for example, transmit (Tx) and receive (Rx) frequency separation, antenna separation, and/or Tx/Rx front-end path isolation using one or more duplexers and/or filters, to reduce Tx leakage into the Rx communication path—referred to as self-interference. However, these isolation techniques require complex signal processing and increased power consumption of the receiver.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The aspects of the present disclosure will be described with reference to the accompanying drawings. The drawing in which an element first appears is typically indicated by the leftmost digit(s) in the corresponding reference number.

DETAILED DESCRIPTION

Figure 1:
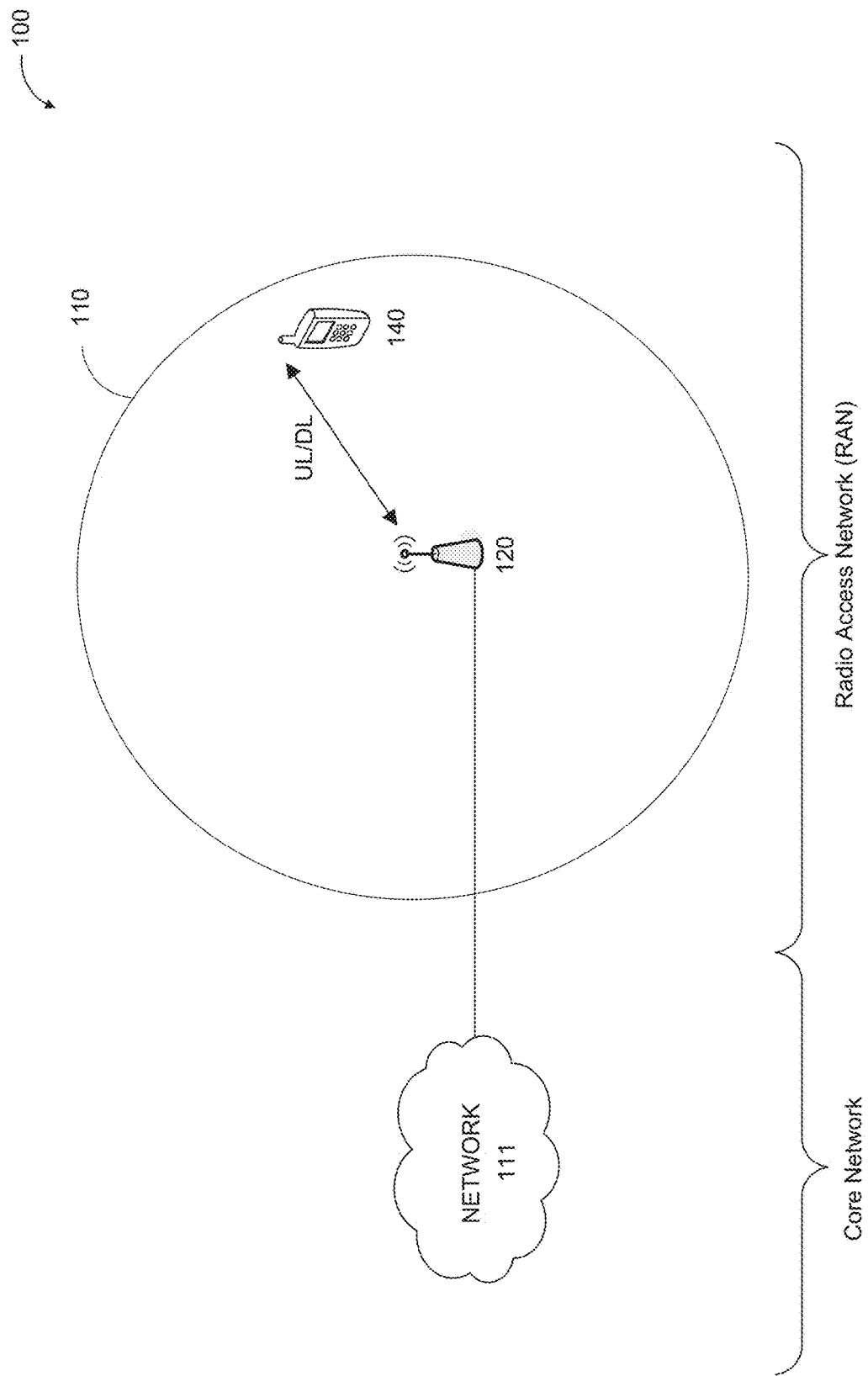
FIG. 1 illustrates an exemplary communication network environment.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor.

For purposes of this discussion, the term "module" shall be understood to include one of software, firmware, hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

In the following disclosure, terms defined by one or more standards, such as the Long-Term Evolution (LTE) and/or LTE Advanced standards, are sometimes used. For example, the term "eNodeB" or "eNB" is used to refer to what is commonly described as a base station (BS) or a base transceiver station (BTS) in other standards. The term "User Equipment (UE)" is used to refer to what is commonly described as a mobile station (MS) or mobile terminal in other standards. The LTE and LTE Advanced standards are developed by the 3rd Generation Partnership Project (3GPP) and described in the 3GPP TS 36 standard titled "Evolved Universal Terrestrial Radio Access (E-UTRA); Physical layer procedures," and the International Mobile Telecommunications-2000 (IMT-2000) and IMT Advanced standards.

As will be apparent to a person of ordinary skill in the art based on the teachings herein, exemplary aspects are not limited to the LTE and/or LTE Advanced standards, and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary aspects are not limited to cellular communication networks and can be used or implemented in other kinds of wireless communication access networks, including (but not limited to) Wi-Fi (IEEE 802.11), Bluetooth, Near-field Communication (NFC) (ISO/IEC 18092), ZigBee (IEEE 802.15.4), and/or Radio-frequency identification (RFID), to provide some examples.

Further, exemplary aspects are not limited to the above wireless networks and can be used or implemented in one or more wired networks using one or more well-known wired specifications and/or protocols.

Figure 2:
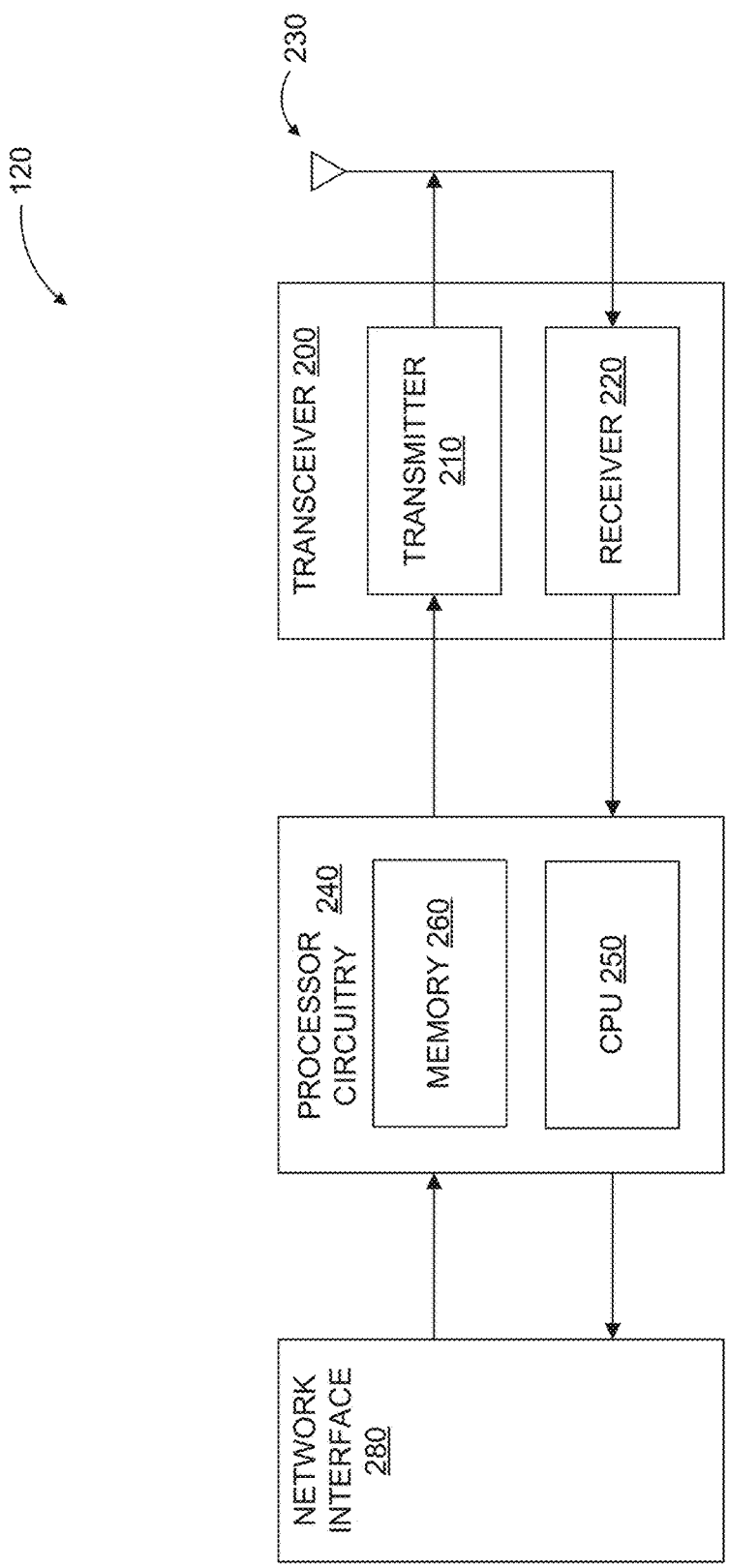
FIG. 2 illustrates a base station according to an exemplary aspect of the present disclosure.
Figure 3:
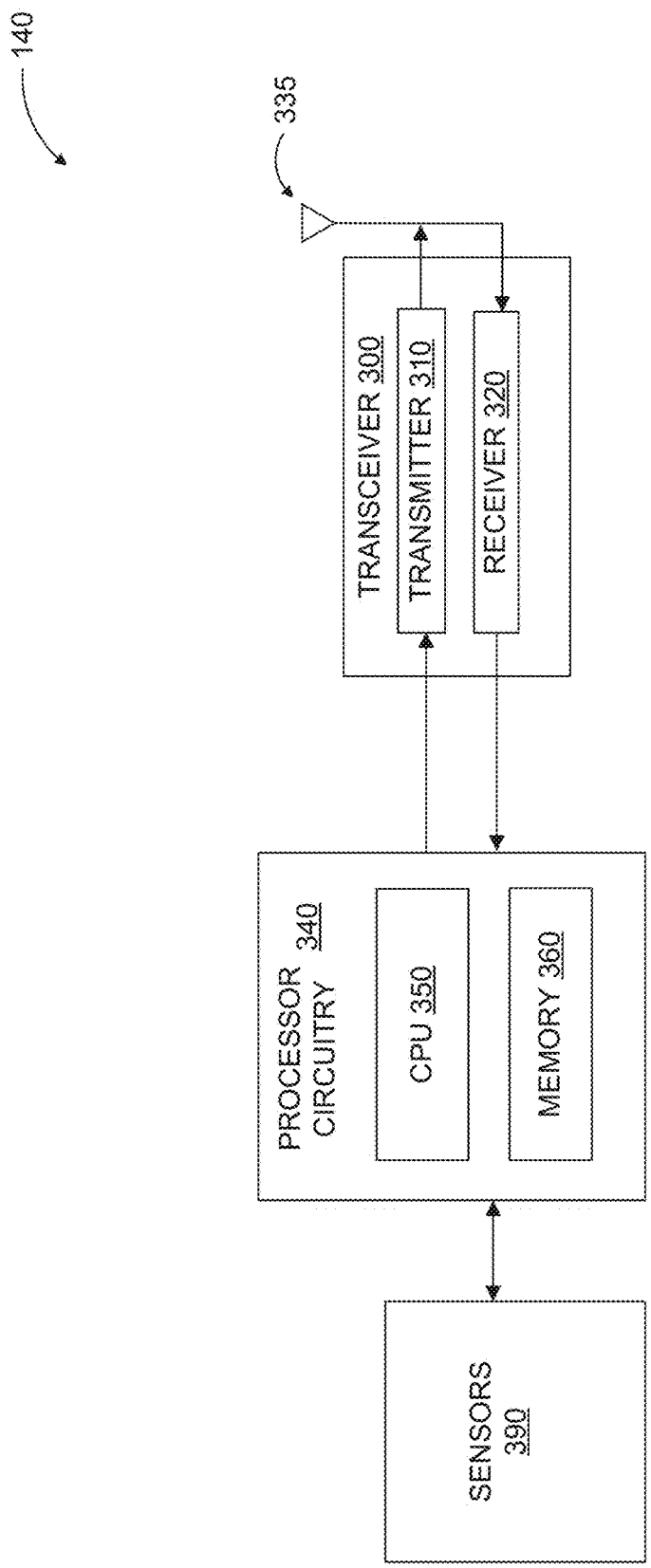
FIG. 3 illustrates a mobile device according to an exemplary aspect of the present disclosure.

The present disclosure is directed to an interference estimator configured to estimate interference to cancel and/or substantially reduce interference, including self-interference, within a received and/or transmit signal. In an exemplary aspect, the interference estimator is included in a mobile device (e.g., laptop computer, a tablet computer, a mobile telephone, etc.) and configured to estimate interference to cancel and/or substantially reduce interference, including self-interference, within a communication signal received and/or transmitted by the mobile device. As described in detail below, FIG. 1-3 illustrate an example communication environment, and an example mobile device and base station configured to operate within the communication environment.

FIG. 1 illustrates an example communication environment 100 that includes a radio access network (RAN) and a core network. The RAN includes one or more base stations 120 and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network.

The number of base stations 120, mobile devices 140, and/or networks 111 are not limited to the exemplary quantities illustrated in FIG. 1, and the communication environment 100 can include any number of the various components as would be understood by one of ordinary skill in the relevant art(s).

In an exemplary aspect, the base station 120 and mobile device 140 each include one or more processors, circuitry, and/or logic that are configured to communicate via one or more wireless technologies. The mobile device 140 can be further configured to support co-existing wireless communications with one or more other mobile devices. The mobile device 140 can include, for example, a transceiver having one or more processors, circuitry, and/or logic that are configured to transmit and/or receive wireless communications via one or more wireless technologies within the communication environment 100. The base station 120 can include one or more processors, circuitry, and/or logic that are configured to: (1) receive one or more wired communications via one or more well-known wired technologies from the backhaul communication network 111 and/or from one or more other base stations 120, and transmit one or more corresponding wireless communications via one or more wireless technologies within the communication environment 100, (2) receive one or more wireless communications within the communication environment 100 via one or more wireless technologies and transmit one or more corresponding wired communications via one or more well-known wired technologies to the backhaul communication network 111 and/or to one or more other base stations 120, and (3) to transmit and/or receive wireless communications via one or more wireless technologies within the communication environment 100. The wireless technologies can include one or more of the wireless protocols discussed above. In an exemplary aspect, the base station(s) 120 are configured to transmit and/or receive wireless communications conforming to the 3GPP's LTE specification. The one or more processors can include (and be configured to access) one or more internal and/or external memories that store instructions and/or code that, when executed by the processor(s), cause the processor(s) to perform one or more operations to facilitate communications via one or more wireless and/or wired technologies as discussed herein.

In an exemplary aspect, the mobile device 140 can be configured to communicate with the base station 120 in a serving cell or sector 110 of the communication environment 100. For example, the mobile device 140 receives signals on one or more downlink (DL) channels from the base station 120, and transmits signals to the base station 120 on one or more respective uplink (UL) channels.

In exemplary aspects, the mobile devices 140 can be configured to communicate with one or more other mobile devices utilizing one or more device-to-device communication connections (e.g., using one or more personal access networks (PANs)) via one or more wireless communication protocols—such as LTE, Bluetooth, WLAN, etc. The one or more mobile devices 140 can be within, or outside of, the serving cell or sector 110.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects, the mobile device 140 may be a stationary device, including, for example, a stationary computing device—such as a personal computer (PC), a desktop computer, a computerized kiosk, and an automotive/aeronautical/maritime in-dash computer terminal.

In an exemplary aspect, the base stations 120 include one or more processors, circuitry, and/or logic that are configured for communications conforming to the IEEE's 802.11 WLAN specification (e.g., the base stations are wireless local area network (WLAN) base stations). Similarly, the mobile device 140 includes one or more processors, circuitry, and/or logic that are configured for communications conforming to the IEEE's 802.11 WLAN specification. The one or more processors, circuitry, and/or logic of the mobile device 140 can be further configured for communications conforming to one or more other 3GPP and/or non-3GPP protocols via one or more device-to-device communication networks established with one or more other mobile devices. In this example, the communication network 100 is wireless local area network (WLAN) conforming to IEEE's 802.11 WLAN specification. In an exemplary aspect, the communication of the mobile device 140 with one or more other mobile devices 140 can be a device-to-device communication that bypasses the base stations 120.

Those skilled in the relevant art(s) will understand that the base station 120 and the mobile device(s) 140 are not limited to IEEE's 802.11 WLAN specification, and the base station 120 and/or the mobile device(s) 140 can be configured for wireless communications conforming to one or more other 3GPP and/or non-3GPP wireless protocols in addition to, or in the alternative to, the wireless protocols discussed herein.

FIG. 2 illustrates the base station 120 according to an exemplary aspect of the present disclosure. For example, the base station 120 can include a transceiver 200 and a network interface 280, each communicatively coupled to processor circuitry 240.

The transceiver 200 includes one or more processors, circuitry, and/or logic that are configured to transmit and/or receive wireless communications via one or more wireless technologies within the communication environment 100. For example, the transceiver 200 can include a transmitter 210 and a receiver 220 that have one or more processors, circuitry, and/or logic configured to transmit and receive wireless communications, respectively, via one or more antennas 230. Those skilled in the relevant art(s) will recognize that the transceiver 200 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 230 may include an integer array of antennas, and that the antenna 230 may be capable of both transmitting and receiving wireless communication signals. For example, the base station 120 can be configured for wireless communication utilizing a Multiple-input Multiple-output (MIMO) configuration.

In an exemplary aspect, the transceiver 200 is configured for wireless communications conforming to 3GPP's LTE specification. In this example, the transceiver 200 can be referred to as LTE transceiver 200. Those skilled in the relevant art(s) will understand that the transceiver 200 is not limited to communication conforming to 3GPP's LTE specification, and can be configured for communications that conform to one or more other 3GPP protocols and/or one or more non-3GPP protocols. It should be appreciated that the transceiver 200 can be referred to by one or more other 3GPP and/or non-3GPP protocols in aspects where the transceiver 200 is configured for such other communications conforming to the other protocols.

The network interface 280 includes one or more processors, circuitry, and/or logic that are configured to transmit and/or receive communications via one or more wired technologies to/from the backhaul communication network 111. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The processor circuitry 240 can include one or more processors (CPUs) 250 and/or circuits configured to carry out instructions to perform arithmetical, logical, and/or input/output (I/O) operations of the base station 120 and/or one or more components of the base station 120. The processor circuitry 240 can further include a memory 260 that stores data and/or instructions, where when the instructions are executed by the processor(s) 250, perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

FIG. 3 illustrates the mobile device 140 according to an exemplary aspect of the present disclosure. The mobile device 140 can include processor circuitry 340 communicatively coupled to one or more transceivers configured to communicate with one or more 3GPP and/or non-3GPP communication protocols. That is, the mobile device 140 can be configured for wireless communications conforming to one or more wireless protocols defined by 3GPP and/or one or more non-3GPP wireless protocols. In an exemplary aspect, the mobile device 140 includes a transceiver 300. In an exemplary aspect, the transceiver 300 is configured for wireless communications conforming to 3GPP's LTE specification. In this example, the transceiver 300 can be referred to as LTE transceiver 300. Those skilled in the relevant art(s) will understand that the transceiver 300 is not limited to communication conforming to 3GPP's LTE specification, and can be configured for communications that conform to one or more other 3GPP protocols and/or one or more non-3GPP protocols. For example, the transceiver 300 can be configured for wireless communications conforming to one or more other 3GPP and/or non-3GPP wireless protocols (e.g., NFC, Bluetooth, etc.) in addition to, or in the alternative to, the LTE specification and/or one or more of the wireless protocols discussed herein.

The transceiver 300 includes one or more processors, circuitry, and/or logic that are configured for transmitting and/or receiving wireless communications conforming to one or more wireless protocols (e.g., 3GPP's LTE specification). In particular, the transceiver 300 can include a transmitter 310 and a receiver 320 that have one or more processors, circuitry, and/or logic configured for transmitting and receiving wireless communications conforming to one or more wireless protocols (e.g., 3GPP's LTE specification), respectively, via one or more antennas 335. Transceiver 300 need not be limited to, for example, LTE and could operate according to one or more other 3GPP and/or non-3GPP protocols, as will be understood by those skilled in art.

In exemplary aspects, the transceiver 300 can include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The processor circuitry 340 includes one or more processors, circuitry, and/or logic that are configured to control the overall operation of the mobile device 140, such as the operation of the transceiver 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.).

In an exemplary aspect, the processor circuity 340 includes one or more processors (CPUs) 350—such as, for example, one or more baseband processors and/or one or more application processors. As would be understood by those skilled in the relevant arts, the one or more processors (CPUs) 350 may be embodied as a single chip and/or die, or as multiple chips and/or dies.

In an exemplary aspect, the mobile device 140 includes one or more other transceivers (not shown) configured to communicate via one or more 3GPP protocols, one or more non-3GPP protocols, and/or one or more other well-known communication technologies. In an exemplary aspect, the one or more other transceivers can be configured for navigational purposes utilizing one or more well-known navigational systems, including the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples. Further, the mobile device 140 can include one or more positional and/or movement sensors 390 (e.g., GPS, accelerometer, gyroscope sensor, etc.) implemented in (and/or in communication with) the mobile device 140. Here, the location and/or movement of the mobile device 140 can be determined using one or more transceivers configured for navigation purposes, one or more of the positional and/or movement sensors 390, and/or one or more positional determinations using signal characteristics relative to one or more base stations and/or access points.

Figure 4:
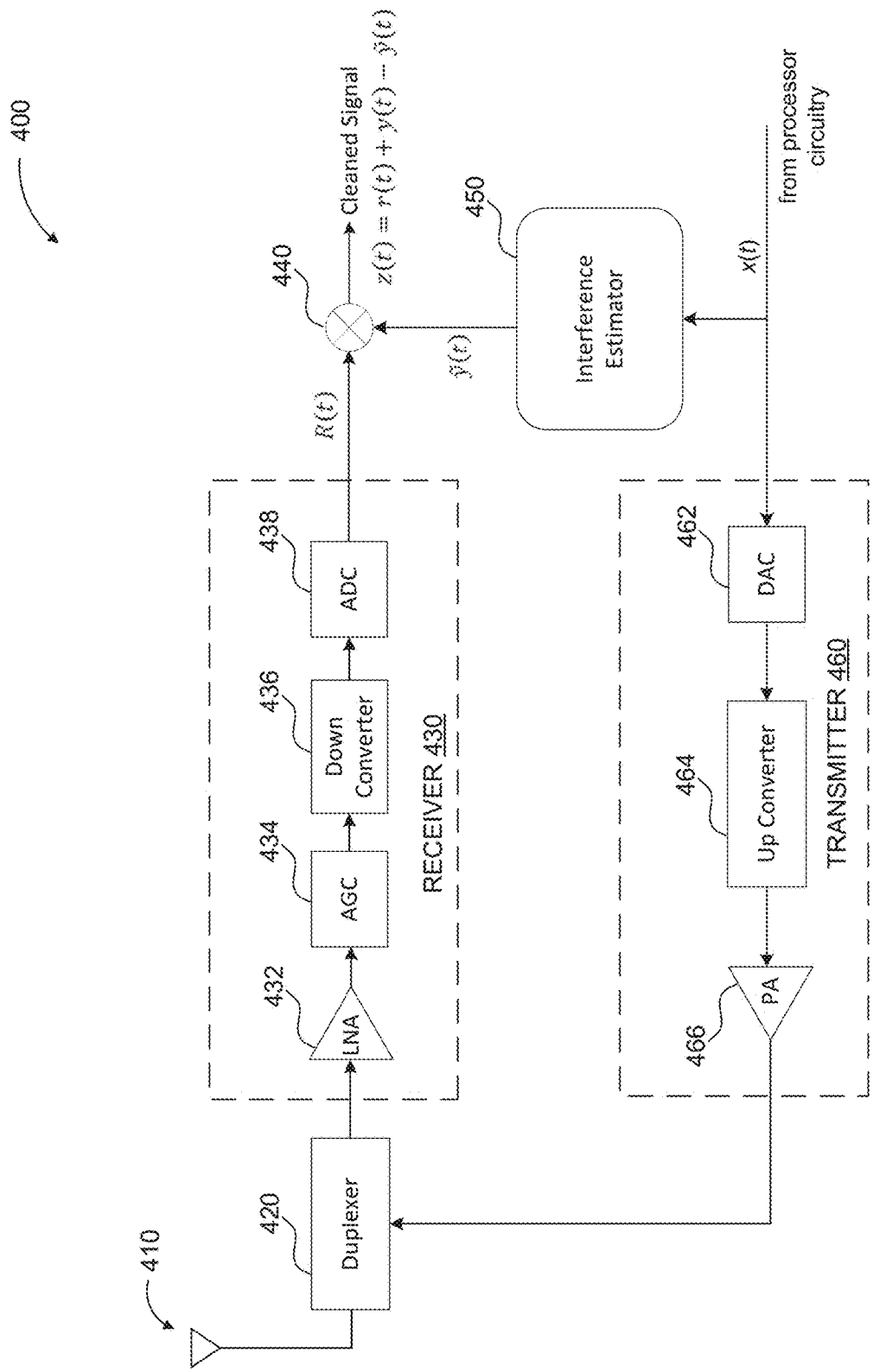
FIG. 4 illustrates a wireless communication device according to an exemplary aspect of the present disclosure.

FIG. 4 illustrates a wireless communication device 400 according to an exemplary aspect of the present disclosure. In an exemplary aspect, the wireless communication device 400 includes a duplexer 420, receiver 430, a subtractor 440, an interference estimator 450, and a transmitter 460. The receiver 430 and the transmitter 460 can be communicatively coupled to an antenna 410 via the duplexer 420. In another aspect, the wireless communication device 400 can omit the duplexer when the transmitter 460 and the receiver 430 have their own dedicated antenna 410.1 and 410.2, respectively.

In one or more exemplary aspects, the wireless communication device 400 can be included in, or otherwise communicatively coupled to, the mobile device 140. In aspects in which the wireless communication device 400 is comprised within the mobile device 140, the receiver 430, the transmitter 460, and the antenna 410 can be exemplary aspects of the receiver 320, transmitter 310, and antenna 335 as illustrated in FIG. 3, respectively. Further, the interference estimator 450 can be included in, or otherwise communicatively coupled to, the processor circuitry 340. In this example, one or more of the processors (CPUs) 350 can be configured to perform one or more of the operations of the interference estimator 450 described herein. Further, the one or more CPUs 350 can be configured to access memory 360 (and/or one or more external memories) that store instructions and/or code that, when executed by the CPU(s) 350, cause the CPU(s) 350 to perform one or more operations associated with the interference estimator 450 as described herein.

The receiver 430 can include one or more processors, circuitry, and/or logic that are configured for receiving wireless communications conforming to one or more wireless protocols (e.g., 3GPP's LTE specification) via antenna 410. The receiver 430 need not be limited to, for example, LTE and could operate according to one or more other wireless protocols as will be understood by those skilled in art.

In an exemplary aspect, the receiver 430 can include a low-noise amplifiers (LNA) 432, an automatic gain control (AGC) 434, a down converter 436, and an analog-to-digital converter (ADC) 438. The LNA 432 can include suitable logic, circuitry, and/or code that is configured to amplify a received input signal and to output the amplified input signal that has been amplified by a predetermined gain value. The AGC 434 can include suitable logic, circuitry, and/or code that are configured to regulate the gain of the received signal to provide a controlled signal amplitude at the output of the AGC 434. The down converter 436 can include suitable logic, circuitry, and/or code that are configured to covert the received signal centered at an intermediate frequency (IF) to a baseband signal centered at zero frequency. The ADC 438 can include suitable logic, circuitry, and/or code that are configured to convert a received analog signal to a digital signal. The receiver 430 can also include (but is not limited to) a digital signal processor (DSP), modulator and/or demodulator, and/or a frequency converter (including mixers, local oscillators, and filters) that can be utilized in the receiving of wireless communications.

In an exemplary aspect, the transmitter 460 can include a digital-to-analog converter (DAC) 462, an up converter 464 and a power amplifier (PA) 466. The DAC 462 can include suitable logic, circuitry, and/or code that are configured to convert a received digital signal to an analog signal. The up converter 464 can include suitable logic, circuitry, and/or code that are configured to convert a baseband signal centered at zero frequency to a signal centered at an intermediate frequency (IF). The PA 466 can include suitable logic, circuitry, and/or code that are configured to amplify a received input signal and to output the amplified input signal that has been amplified by a predetermined gain value. The transmitter 460 can also include (but is not limited to) a digital signal processor (DSP), modulator and/or demodulator, and/or a frequency converter (including mixers, local oscillators, and filters) that can be utilized in the transmitting of wireless communications.

The duplexer 420 can include suitable logic, circuitry, and/or code that is configured to allow bi-directional (duplex) communication over a single path to/from two devices—transmitter 460 and receiver 430. That is, the duplexer 420 isolates the transmitter 460 and the receiver 430 while permitting them to share a path (e.g., antenna 410). In operation, the duplexer 420 is connected to the LNA 432 of receiver 430 and to the output of the PA 466 of transmitter 460.

The subtractor 440 can include one or more processors, circuitry, and/or logic that are configured to subtract a received signal from another receiver signal to generate a signal representing the difference of the two inputs. In an exemplary aspect, the subtractor 440 can be configured to subtract one or more interference cancellation signals ỹ(t) generated by the interference estimator 450 from one or more communication signals R(t)=r(t)+y(t) provided by the receiver 430 to generate one or more cleaned signals z(t), where z(t)=r(t)+y(t)−ỹ(t). In this example, R(t) is a receive signal that includes a communication signal portion r(t) and interference y(t) that is imposed on the communication signal R(t). As discussed in detail below, the interference estimator 450 is configured to generate one or more interference cancellation signals ỹ(t), where the interference cancellation signal(s) ỹ(t) can be equal to, or substantially equal to, the interference y(t) to cancel or suppress the interference from the communication signal R(t).

The interference estimator 450 can include one or more processors, circuitry, and/or logic that are configured to perform one or more interference cancellation processes on a received signal to generate one or more interference cancellation signals ỹ(t) to cancel and/or suppress interference within one or more signals received by the wireless communication device 400 via, for example, antenna 410.

In operation, the interference estimator 450 can be configured to receive a signal from, for example, processor circuitry 340 that is be transmitted by transmitter 460. The interference estimator 450 can then generate one or more interference cancellation signals ỹ(t) based on the received signal. The interference estimator 450 can then provide the one or more interference cancellation signals to the subtractor 440, which can be configured to subtract the interference cancellation signal(s) ỹ(t) from one or more received signals R(t)=r(t)+y(t) to generate one or more cleaned signals z(t)=r(t)+y(t)−ỹ(t).

In an exemplary aspect, the interference estimator 450 can be configured to perform one or more interference cancellation processes utilizing a portion (or more) of one or more transmission signals (i.e., signals to be transmitted) and/or portion(s) (or more) of one or more previously transmitted signals, and/or one or more previously transmitted signals, and/or information associated with one or more transmission signals and/or one or more previously transmitted signals. For example, the interference estimator 450 can be configured to receive a transmission signal x(t) provided to the transmitter 460 for subsequent transmission by the transmitter 460. In this example, the interference estimator 450 can be configured to generate one or more interference cancellation signals y(t) based on one or more transmission signal x(t).

In an exemplary aspect, the interference estimator 450 can be configured to utilize one or more pilot signals, preambles, synchronization sequences, and/or spreading sequences within (and/or associated with) one or more transmission signals and/or one or more previously transmitted signals, to perform one or more interference cancellation processes. In an exemplary aspect, the interference estimator 450 can be configured to utilize one or more demodulation reference signal (DMRS) symbols of one or more physical uplink shared channels (PUSCHs) within (and/or associated with) one or more transmitted signals and/or one or more signals to be transmitted, to perform one or more interference cancellation processes.

In an exemplary aspect, the one or more interference cancellation processes can include one or more adaptive filtering processes, and the interference estimator 450 can be configured to perform the one or more adaptive filtering processes to generate one or more interference cancellation signals. For example, the interference estimator 450 can be configured to perform the one or more adaptive filtering processes based on a transmission signal x(t) for one or more N slots of the transmission signal x(t). In this example, the transmission signal x(t) for N slots can be represented as follows:

$$\vec{x} = (x(t), x(t-1), x(t-N+1))' \quad \text{(Equation 1)}$$

Herein the prime notation (i.e., ') denotes a matrix transpose operation as would be understood by one of ordinary skill in the relevant art(s).

In an exemplary aspect, the interference estimator 450 can be configured to perform one or more adaptive filtering processing on transmission signal x̃(t) to generate an interference cancellation signal ỹ(t), as represented by Equation 1 as follows:

$$\tilde{y}(t) = w'(t-1)u(\vec{x}(t)) \quad \text{(Equation 2)}$$

where w(t−1) corresponds to one or more filter weights at time t−1 and has a length N×M. In this example, $$u(\vec{x}(t)) = (u_1(\vec{x}(t))', u_2(\vec{x}(t))', \ldots u_M(\vec{x}(t))')' \quad \text{(Equation 3)}$$

is a vector of length N×M, where each $u_m(\vec{x}(t))$ is a (column) vector of length N and can be referred to as a kernel, and $\vec{x}(t)$ denotes the past N samples of the transmitted signal $\vec{x} = (x(t), x(t-1), x(t-2), \ldots, x(t-N+1))'$. For brevity, Equation 3 can be represented as $\vec{u}(t) = (\vec{u}_1(t)', \vec{u}_2(t)', \ldots, \vec{u}_M(t)')'$ (Equation 4), where the matrix $\vec{u}(t)$ has a dimension M·N×1. In an exemplary aspect, the number of slots N=20 and the number of kernels M=11. However, the number of slots and kernels are not limited to these example values and can be one or more other values as understood by those skilled in the relevant art(s).

For the purpose of this discussion, a kernel represents a mapping function applied to the transmission signal x(t). In exemplary aspects, the mapping functions can be one or more well-known functions, including, for example, a square ($x^2$), a cube ($x^3$), one more polynomial functions, etc. For example, a first kernel $u_1(\vec{x}(t))$ can represent a mapping function corresponding to the square of the transmission signal x(t) (e.g., $u_1(\tilde{x}(t)) = (x(t)^2, x(t-1)^2, \ldots, x(t-N+1)^2)'$). Similarly, a second kernel can represent a mapping function corresponding to the cube of the transmission signal x(t) (e.g., $u_2(\tilde{x}(t)) = (x(t)^3, x(t-1)^3, \ldots, x(t-N+1)^3)'$), a polynomial function of the transmission signal x(t), or one or more other mapping functions as would be understood by those skilled in the relevant art(s).

In an exemplary aspect, the interference estimator 450 can be configured to adapt one or more filter weights w(t) using one or more adaptive filter processes. For example, the interference estimator 450 can be configured to perform one or more linear mean square (LMS) processes on the filter weights w(t), one or more recursive linear square (RLS) processes, and/or one or more other well-known adaptive filter processes as would be understood by one of ordinary skill in the relevant art(s).

In an exemplary aspect, the interference estimator 450 can be configured to perform one or more recursive linear square (RLS) processes to adapt one or more filter weights w (t) as represented in Equations 5.1 to 5.4 as follows:

$$k(t) = \frac{P(t-1)\vec{u}(t)}{1 + \vec{u}(t)' P(t-1)\vec{u}(t)} \quad \text{(Equation 5.1)}$$

$$e(t) = y(t) - w(t-1)'\vec{u}(t) \quad \text{(Equation 5.2)}$$

$$w(t) = w(t-1) + k(t)e(t) \quad \text{(Equation 5.3)}$$

$$P(t) = P(t-1) - k(t)\vec{u}(t)' P(t-1) \quad \text{(Equation 5.4)}$$

where P(t) is a square matrix having the dimension M·N×M·N and e(t) corresponds to an error within the RLS estimation. In an exemplary aspect, P(t) is an inverse of a weighted correlated matrix of one or more kernels. In operation, the RLS process recursively determines a (new) filter weight w(t) based on a filter weight at time t−1 (e.g., w(t−1)), the estimation error at time t, and the matrix P(t−1).

In an exemplary aspect, the interference estimator 450 can be configured to orthogonalize the kernel vectors ($\vec{u}_1(t)$, $\vec{u}_2(t)$, ... $\vec{u}_M(t)$) utilizing a transformation matrix F as represented in Equation 6 as follows:

$$F(\vec{u}(t)) = F*(\vec{u}_1(t), \vec{u}_2(t), \ldots \vec{u}_M(t))' \quad \text{(Equation 6)}$$

In this example, the M vectors after the transformation can be represented as $F(\vec{u}(t)) = (\vec{v}_1(t), \vec{v}_2(t), \ldots \vec{v}_M(t))$. Further, $\vec{v}(t)$ can be used to represent one or more sets of (new) kernel vectors $F(\vec{u}(t))$. Here the transformation matrix F has dimension N×N, and is defined such that $E(\vec{v}_a(t)\vec{v}_b(t)') \approx 0$ whenever a is different from b. That is, E (F($\vec{u}(t)$)'F($\vec{u}(t)$))) is substantially diagonal or diagonal. In this example, the orthogonally transformed kernel vectors can be referred to as orthogonal kernels $\vec{v}(t)$. In an exemplary aspect, the orthogonal matrix F can be defined as the inverse of a Cholesky Transformation of $E(F(\vec{u}(t))'F(\vec{u}(t)))$.

In an exemplary aspect, the interference estimator 450 can be configured to determine independent RLS estimations for one or more of the kernels $\vec{u}_1(t), \vec{u}_2(t), \vec{u}_M(t)$. For example, the interference estimator 450 can be configured to generate $RLS_{(1)}$ for $\vec{u}_1(t)$, $RLS_{(2)}$ for $\vec{u}_2(t)$, ..., $RLS_{(M)}$ for $\vec{u}_M(t)$. In an exemplary aspect, the interference estimator 450 can be configured to perform independent recursive linear square (RLS) processes for one or more of the kernels to adapt one or more filter weights $w_m(t)$ as represented in Equations 7.1 to 7.3 as follows:

$$k_m(t) = \frac{P_m(t-1)\vec{u}_m(t)}{1 + \vec{u}_m(t)'P_m(t-1)\vec{u}_m(t)} \quad \text{(Equation 7.1)}$$

$$w_m(t) = w_m(t-1) + k_m(t)e(t) \quad \text{(Equation 7.2)}$$

$$P_m(t) = P_m(t-1) - k_m(t)\vec{u}_m(t)'P_m(t-1) \quad \text{(Equation 7.3)}$$

For example, the interference estimator 450 can be configured to perform independent recursive linear square (RLS) processes for kernel $\vec{u}_1(t)$ to adapt one or more filter weights $w_1(t)$ for a predetermined number of slots $T_0$, then independent RLS processes for kernel $\vec{u}_2(t)$ to adapt one or more filter weights $w_2(t)$ for the next $T_0$ slots, then independent RLS processes for kernel $\vec{u}_3(t)$ to adapt one or more filter weights $w_3(t)$ for the next $T_0$ slots, and so on. It should be understood that the independent RLS processes are not limited to the consecutive order of the kernel with respect to the order of the set of $T_0$ slots. In these examples, the $RLS_{(M)}$ estimations for the respective vectors independently adapt the portions of the filter weights w(t) corresponding to the particular (sub)vector (i.e., filter weights $w_m(t)$). For example, the $RLS_{(1)}$ estimations adapt the corresponding filter weights $w_1(t)$ portion of the filter weights w (t).

In an exemplary aspect, with reference to Equation 6, the interference estimator 450 can be configured to orthogonalize one or more of the kernels $\vec{u}_1(t), \vec{u}_2(t), \vec{u}_M(t)$ to generate one or more orthogonal kernels $\vec{v}(t)$. In this example, the orthogonal kernel(s) $\vec{v}(t)$ can be used by the interference estimator 450 to determine independent RLS estimations for one or more of the orthogonal kernel(s)

In an exemplary aspect, the interference estimator 450 can be configured to determine two or more parallel RLS estimations using two or more of the independent RLS estimations described above with respect to Equations 7.1-7.3. For example, the interference estimator 450 can be configured to perform independent RLS processes for kernel $\vec{u}_1(t)$ to adapt one or more filter weights $w_1(t)$ for a predetermined number of slots $T_0$. For the next $T_0$ slots, the interference estimator 450 can be configured to perform independent RLS processes for kernel $\vec{u}_1(t)$ and for kernel $\vec{u}_2(t)$ to adapt filter weights $w_1(t)$ and filter weights $w_2(t)$ for the next $T_0$ slots. For the next $T_0$ slots, the interference estimator 450 can be configured to perform independent RLS processes for kernel $\vec{u}_1(t)$, kernel $\vec{u}_2(t)$, and kernel $\vec{u}_3(t)$ to adapt filter weights $w_1(t)$, filter weights $w_2(t)$, and filter weights $w_3(t)$ for the next $T_0$ slots, and so on. It will be understood by one of ordinary skill in the relevant art(s) that the parallel RLS estimations are not limited to increasing the number of independent RLS processes with respect to consecutive kernels for each iteration of $T_0$ slots, and that for each iteration, the number of independent RLS processes can be increased by one or more kernels of the subset of M kernels. For example, the first iteration can be kernel $\vec{u}_2(t)$, the second iteration can be kernel $\vec{u}_2(t)$ and kernel $\vec{u}_5(t)$, the third iteration can be kernels $u_2(t)$, $\vec{u}_5(t)$, and $\vec{u}_4(t)$, and so on. As another example, the first iteration can be kernel $\vec{u}_3(t)$, the second iteration can be kernel $\vec{u}_3(t)$ and kernel $\vec{u}_5(t)$, the third iteration can be kernels $\vec{u}_3(t)$, $\vec{u}_5(t)$, $\vec{u}_4(t)$, and $\vec{u}_6(t)$, and so on. That is, subsequent iterations can increase the number of independent RLS processes by one or more kernels of the subset of M kernels, and that the kernels can be consecutively selected or non-consecutively selected.

In a parallel RLS estimation operation on, for example, a second iteration of $T_0$ slots, the interference estimator 450 can be configured to perform an independent RLS processes using, for example, kernels $\vec{u}_1(t)$ and $\vec{u}_2(t)$. In this example, the adaptive processing of filter weights $w_1(t)$ and $w_2(t)$ are represented using Equations 7.1 to 7.3 as shown in Table 1 below:

| Kernel 1 | Kernel 2 |
|---|---|
| $k_1(t) = \dfrac{P_1(t-1)\vec{u}_1(t)}{1 + \vec{u}_1(t)'P_1(t-1)\vec{u}_1(t)}$ | $k_2(t) = \dfrac{P_2(t-1)\vec{u}_2(t)}{1 + \vec{u}_2(t)'P_1(t-1)\vec{u}_2(t)}$ |
| $w_1(t) = w_1(t-1) + k_1(t)e(t)$ | $w_2(t) = w_2(t-1) + k_2(t)e(t)$ |
| $P_1(t) = P_1(t-1) - k_1(t)\vec{u}_1(t)'P_1(t-1)$ | $P_2(t) = P_2(t-1) - k_2(t)\vec{u}_2(t)'P_2(t-1)$ |

In this example, two independent, parallel RLS estimation processes are performed to adaptively determine the filter weights $w_1(t)$ and $w_2(t)$. Based on these filter weights, the interference estimator 450 can be configured to determine an interference cancellation signal ŷ(t) that can be subtracted from a receive signal R(t) to cancel and/or suppress interference y(t) with the receive signal R(t).

In an exemplary aspect, with reference to Equation 6, the interference estimator 450 can be configured to orthogonalize one or more of the kernels $\vec{u}_1(t), \vec{u}_2(t), \vec{u}_M(t)$ to generate one or more orthogonal kernels $\vec{v}(t)$. In this example, the orthogonal kernel(s) $\vec{v}(t)$ can be used by the interference estimator 450 to determine parallel RLS estimations for one or more of the orthogonal kernel(s) $\vec{v}(t)$.

In an exemplary aspect, the interference estimator 450 can be configured to determine one or more cascade RLS estimations for one or more of the kernels $\vec{u}_1(t), \vec{u}_2(t), \ldots, \vec{u}_M(t)$. For example, the interference estimator 450 can be configured to generate an $RLS_{(s)}$ estimation using one or more kernels $\vec{Q}_m(t)$, where $\vec{Q}_m(t)$, corresponds to one or kernels in $\{\vec{u}_1(t), \vec{u}_2(t), \ldots, \vec{u}_M(t)\}$, and s is a subset of the kernel indices $\{1, 2, \ldots, M\}$. In an exemplary aspect, when $\vec{Q}_m(t)$ corresponds to two or more kernels, it is the sum of the two or more kernels. For example, for an $RLS_{(1,2)}$ estimation using kernels $\vec{u}_1(t)$ and $\vec{u}_2(t)$, $\vec{Q}_m(t)$ is defined as $\vec{Q}_m(t)=\vec{u}_{1+2}(t)=(\vec{u}_1(t)', \vec{u}_2(t)')'$. In this example, the cascaded kernel $\vec{u}_{1+2}(t)$ has a dimension 2N×1. That is, the vector $\vec{Q}_m(t)$ will have a dimension CN×1, where C is the number of kernels within the cascaded kernel (e.g., C=2 for cases where the $\vec{Q}_m(t)=\vec{u}_{1+2}(t)$).

In an exemplary aspect, the interference estimator 450 can be configured to perform cascading RLS processes for one or more of the kernels to adapt one or more filter weights $w_Q(t)$ as represented in Equations 8.1 to 8.3 as follows:

$$k_Q(t) = \frac{\overline{P}_m(t-1)\vec{Q}_m(t)}{1+\vec{u}_m(t)'\overline{P}_m(t-1)\vec{u}_m(t)} \quad \text{(Equation 8.1)}$$

$$w_Q(t) = w_Q(t-1) + k_Q(t)e(t) \quad \text{(Equation 8.2)}$$

$$\overline{P}_Q(t) = \overline{P}_Q(t-1) - k_Q(t)\vec{u}_Q(t)'\overline{P}_Q(t-1) \quad \text{(Equation 8.3)}$$

where $\overline{P}_Q(t)$ is a square matrix having the dimension (CN)×(CN), where C is the number of kernels within the cascaded kernel, and $w_Q(t)$ is the sub-vector of w(t) corresponding to the kernels in the subset s.

For example, the interference estimator 450 can be configured to perform RLS estimation for kernel $\vec{u}_1(t)$ to adapt one or more filter weights $w_1(t)$ (a sub-vector of w(t)) for a predetermined number of slots $T_0$, then cascade RLS estimation for kernel $\vec{u}_{1+2}(t)$ to adapt filter weights in ($w_1(t)$, $w_2(t)$) for the next $T_0$ slots, then cascade RLS estimation for kernel $\vec{u}_{1+2+3}(t)$ to adapt filter weights in ($w_1(t)$, $w_2(t)$, $w_3(t)$) for the next $T_0$ slots, and so on. It should be understood that the cascade RLS estimations are not limited to the consecutive order of the kernel with respect to the order of the set of $T_0$ slots.

In an exemplary aspect, with reference to Equation 6, the interference estimator 450 can be configured to orthogonalize one or more of the kernels $\vec{u}_1(t), \vec{u}_2(t), \ldots, \vec{u}_M(t)$ to generate one or more orthogonal kernels $\vec{v}(t)$. In this example, the orthogonal kernel(s) $\vec{v}(t)$ can be used by the interference estimator 450 to determine cascade RLS estimations for one or more of the orthogonal kernel(s) $\vec{v}(t)$.

Figure 5:
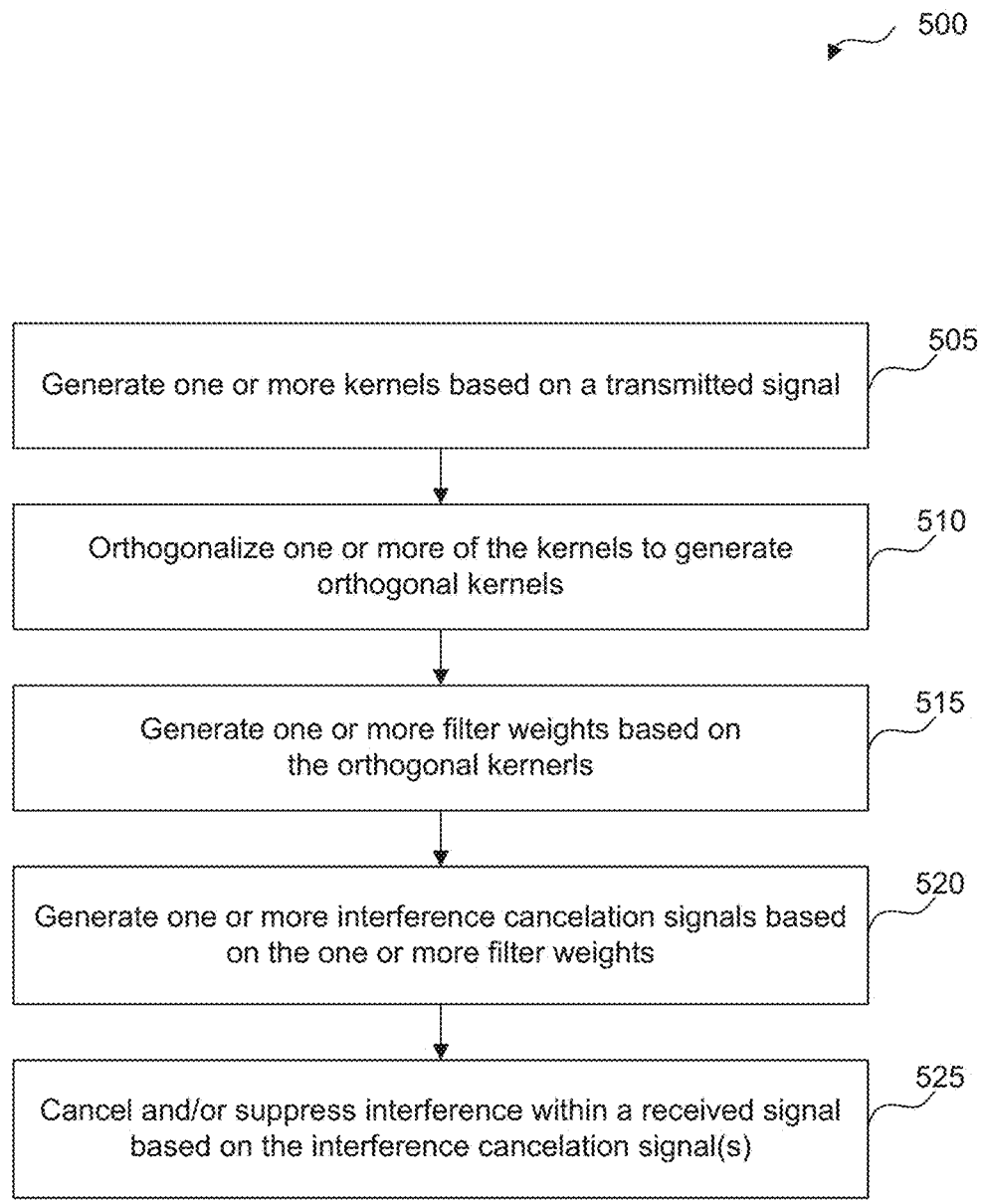
FIG. 5 illustrates an interference cancellation method according to an exemplary aspect of the present disclosure.

FIG. 5 illustrates a flowchart 500 of an interference cancellation method according to an exemplary aspect of the present disclosure. The method of flowchart 500 is described with continued reference to one or more of FIGS. 1-4. The steps of the method of flowchart 500 are not limited to the order described below, and the various steps may be performed in a different order. Further, two or more steps of the method of flowchart 500 may be performed simultaneously with each other.

The method of flowchart 500 begins at step 505, where one or more kernels are generated. For example the interference estimator 450 can be configured to generate one or more kernels $\vec{u}(t)$ based on one or more transmitted and/or to be transmitted signals.

After step 505, the method of flowchart 500 transitions to step 510, where the one or more kernels $\vec{u}(t)$ are orthogonalized. For example, the interference estimator 450 can be configured to orthogonalize one or more of the kernels u(t) to generate one or more orthogonal kernels $\vec{v}(t)$.

After step 510, the method of flowchart 500 transitions to step 515, where one or more filter weights w(t) are generated. For example, the interference estimator 450 can be configured to generate one or more filter weights w(t) based on one or more orthogonal kernels $\vec{v}(t)$. In an exemplary aspect, the interference estimator 450 can be configured to perform one or more RLS estimations based on the one or more orthogonal kernels $\vec{v}(t)$, including one or more independent RLS estimations, one parallel RLS estimations, and/or one or more cascade RLS estimations as described herein.

After step 515, the method of flowchart 500 transitions to step 520, where one or more interference cancellation signals are generated. For example, the interference estimator 450 can be configured to generate one or more interference cancellation signals based on the one or more filter weights w(t).

After step 520, the method of flowchart 500 transitions to step 525, where interference can be canceled and/or suppressed from one or more receive signals. For example, the subtractor 440 can be configured to subtract one or more interference cancellation signals from one or more received signals to generate one or more cleaned signals z(t).

Example 1 is a wireless communication device, comprising a transmitter configured to transmit a transmit signal; a receiver configured to receive a receive signal; and an interference estimator configured to: generate one or more kernels based on the transmit signal; perform one or more estimations based on the one or more kernels to generate one or more filter weights of a set of filter weights; generate one or more interference cancellation signals to cancel interference within the receive signal based on the one or more filter weights and the transmit signal.

In Example 2, the subject matter of Example 1, wherein the interference comprises self-interference between the received and transmit signals.

In Example 3, the subject matter of Example 1, wherein the performing one or more estimations comprises: performing one or more recursive linear square (RLS) estimations based on the one or more kernels.

In Example 4 the subject matter of Example 3, wherein the one or more RLS estimations include an independent RLS estimation with respect to the one or more kernels.

In Example 5, the subject matter of Example 3, wherein the one or more RLS estimations include a parallel RLS estimation with respect to the one or more kernels.

In Example 6, the subject matter of Example 3, wherein the one or more RLS estimations include a cascade RLS estimation with respect to the one or more kernels.

In Example 7, the subject matter of Example 1, wherein the interference estimator is further configured to transform orthogonally the one or more kernels to generate one or more orthogonal kernels.

In Example 8, the subject matter of Example 7, wherein the one or more filter weights are generated by the interference estimator based on the one or more orthogonal kernels.

In Example 9, the subject matter of Example 1, wherein the one or more kernels comprise one or more functions of the transmit signal.

In Example 10, the subject matter of Example 9, wherein the one or more functions include one or more polynomial functions.

In Example 11, the subject matter of Example 1, wherein the wireless communication device is a mobile communication device.

In Example 12, the subject matter of Example 1, wherein the interference estimator is further configured to generate one or more kernels based on the transmit signal.

In Example 13, the subject matter of Example 1, wherein the interference estimator is further configured to generate one or more kernels based on the transmit signal; and wherein the generating the one or more filter weights comprises performing one or more recursive linear square (RLS) estimations based on the one or more kernels.

In Example 14, the subject matter of Example 13, wherein the one or more RLS estimations comprise: an independent RLS estimation with respect to the one or more kernels, a parallel RLS estimation with respect to the one or more kernels, or a cascade RLS estimation with respect to the one or more kernels.

Example 15 is an interference cancellation method, comprising: transmitting, by a transmitter, a transmit signal; receiving, by a receiver, a receive signal; generating, by an interference estimator, one or more kernels based on the transmit signal; performing, by the interference estimator, one or more estimations to generate one or more filter weights of a set of filter weights, the performing the one or more estimations being based on the one or more kernels; and generating, by the interference estimator, one or more interference cancellation signals to cancel interference within the receive signal based on the one or more filter weights and the transmit signal.

In Example 16, the subject matter of Example 15, further comprising canceling or suppressing, by a subtractor, the interference within the receive signal based on the one or more interference cancellation signals.

In Example 17, the subject matter of Example 15, further comprising orthogonally transforming the one or more kernels to generate one or more orthogonal kernels, and wherein the one or more filter weights being generated based on the one or more orthogonal kernels.

In Example 18, the subject matter of Example 15, wherein the performing one or more estimations comprises: performing one or more recursive linear square (RLS) estimations based on the one or more kernels.

In Example 19, the subject matter of Example 17, wherein the performing one or more estimations comprises performing one or more recursive linear square (RLS) estimations based on the one or more orthogonal kernels.

In Example 20, the subject matter of Example 18, wherein the one or more RLS estimations comprise: an independent RLS estimation with respect to the one or more kernels, a parallel RLS estimation with respect to the one or more kernels, or a cascade RLS estimation with respect to the one or more kernels.

In Example 21, the subject matter of Example 19, wherein the one or more RLS estimations comprise: an independent RLS estimation with respect to the one or more orthogonal kernels, a parallel RLS estimation with respect to the one or more orthogonal kernels, or a cascade RLS estimation with respect to the one or more orthogonal kernels.

Example 22 is a computer program product embodied on a non-transitory computer-readable medium comprising program instructions configured such that when executed by processing circuitry cause the processing circuitry to implement the method of Example 15.

Example 23 is a wireless communication device, comprising transmitting means for transmitting a transmit signal; receiving means for receiving a receive signal; and interference estimation means for: generating one or more kernels based on the transmit signal; performing one or more estimations, based on the one or more kernels, to generate one or more filter weights of a set of filter weights; and generating one or more interference cancellation signals to cancel interference within the receive signal based on the one or more filter weights and the transmit signal.

In Example 24, the subject matter of Example 23, wherein the interference estimation means are further configured for orthogonally transforming the one or more kernels to generate one or more orthogonal kernels; and performing, one or more recursive linear square (RLS) estimations based on the one or more orthogonal kernels.

In Example 25, the subject matter of Example 24, wherein the one or more RLS estimations comprise: an independent RLS estimation with respect to the one or more orthogonal kernels, a parallel RLS estimation with respect to the one or more orthogonal kernels, or a cascade RLS estimation with respect to the one or more orthogonal kernels.

In Example 26, the subject matter of any of Examples 1-2, wherein the performing one or more estimations comprises performing one or more recursive linear square (RLS) estimations based on the one or more kernels.

In Example 27, the subject matter of any of Examples 1-2, wherein the interference estimator is further configured to transform orthogonally the one or more kernels to generate one or more orthogonal kernels.

In Example 28, the subject matter of any of Examples 1-8, wherein the one or more kernels comprise one or more functions of the transmit signal.

In Example 29, the subject matter of any of Examples 1-10, wherein the wireless communication device is a mobile communication device.

In Example 30, the subject matter of any of Examples 1-6, wherein the interference estimator is further configured to generate one or more kernels based on the transmit signal.

In Example 31, the subject matter of any of Examples 1-6, wherein the interference estimator is further configured to generate one or more kernels based on the transmit signal; and wherein the generating the one or more filter weights comprises performing one or more recursive linear square (RLS) estimations based on the one or more kernels.

In Example 32, the subject matter of any of Examples 15-16, further comprising orthogonally transforming the one or more kernels to generate one or more orthogonal kernels, the one or more filter weights being generated based on the one or more orthogonal kernels.

In Example 33, the subject matter of any of Examples 15-16, wherein the performing one or more estimations comprises performing one or more recursive linear square (RLS) estimations based on the one or more kernels.

Example 34 is a computer program product embodied on a non-transitory computer-readable medium comprising program instructions configured such that when executed by processing circuitry cause the processing circuitry to implement the method of any of Examples 15-21.

Example 35 is an apparatus substantially as shown and described.

Example 36 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a non-transitory computer-readable medium, which may be read and executed by one or more processors to perform one or more of the processes and/or to implement one or more methods described herein. A non-transitory computer-readable medium may include any mechanism for storing or transmitting information in a form readable by a machine (e.g., a computing device). For example, a non-transitory computer-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In aspects having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A wireless communication device, comprising:
   a transmitter configured to transmit a transmit signal;
   a receiver configured to receive a receive signal; and
   an interference estimator configured to:
      generate a first kernel including a first mapping function of the transmit signal and a second kernel including a second mapping function of the transmit signal, the second mapping function being different from the first mapping function;
      perform one or more cascade estimations for a first portion of the transmit signal using the first kernel, and a following second portion of the transmit signal using both the first and the second kernels to adapt a first filter weight of a set of filter weights based on the first kernel for the first portion of the transmit signal, and to adapt the first filter weight and a second filter weight of the set of filter weights based on the first and the second kernels for the second portion of the transmit signal; and
      generate one or more interference cancellation signals to reduce interference within the receive signal based on the first and second adapted filter weights.

2. The wireless communication device of claim 1, wherein the interference comprises self-interference between the receive signal and the transmit signal.

3. The wireless communication device of claim 1, wherein the performing one or more cascade estimations comprises:
   performing one or more recursive linear square (RLS) estimations based on the first and the second kernels.

4. The wireless communication device of claim 1, wherein the interference estimator is further configured to transform orthogonally the first and second kernels to generate one or more orthogonal kernels.

5. The wireless communication device of claim 4, wherein the first and second filter weights are adapted by the interference estimator based on the first and the second orthogonal kernels.

6. The wireless communication device of claim 1, wherein the first or second mapping functions include a polynomial function.

7. The wireless communication device of claim 1, wherein the wireless communication device is a mobile communication device.

8. The wireless communication device of claim 1, wherein:
   the interference estimator is further configured to generate a third kernel including a third mapping function of the transmit signal different from the first and the second mapping functions, and
   the one or more cascade estimations are further performed for a third portion of the transmit signal following the second portion of the transmit signal using the first kernel, the second kernel and the third kernel to adapt the first filter weight, the second filter weight, and a third filter weight of the set of filter weights based on the first, second and third kernels for the third portion of the transmit signal.

9. The wireless communication device of claim 8, wherein the adapting of the first, second, and third filter weights for the third portion of the transmit signal is based on a function of the first kernel, the second kernel, and the third kernel.

10. The wireless communication device of claim 9, wherein the adapting of the first, second, and third filter weights for the third portion of the transmit signal is based on a sum of the first kernel, the second kernel, and the third kernel.

11. The wireless communication device of claim 1, wherein:

the first portion of the transmit signal is a first number of slots of a set of slots of the transmit signal; and the second portion of the transmit signal is a second number of slots of the set of slots of the transmit signal, the second number of slots following the first number of the slots within the set of slots of the transmit signal.

12. The wireless communication device of claim 1, wherein the adapting of the first and second filter weights for the second portion of the transmit signal is based on a function of the first and the second kernels.

13. The wireless communication device of claim 12, wherein the adapting of the first and second filter weights for the second portion of the transmit signal is based on a sum of the first and the second kernels.

14. The wireless communication device of claim 1, wherein the interference estimator is configured to generate the one or more interference cancellation signals based on the one or more filter weights and the transmit signal.

15. An interference cancellation method, comprising:
transmitting, by a transmitter, a transmit signal;
receiving, by a receiver, a receive signal;
generating, by an interference estimator, a first kernel including a first mapping function of the transmit signal and a second kernel including a second mapping function of the transmit signal, the second mapping function being different from the first mapping function;
performing, by the interference estimator, one or more cascade estimations for a first portion of the transmit signal using the first kernel and for a following second portion of the transmit signal using both the first and the second kernels to adapt a first filter weight of a set of filter weights based on the first kernel for the first portion of the transmit signal, and to adapt the first filter weight and a second filter weight of the set of filter weights based on the first and the second kernels for the second portion of the transmit signal; and
generating, by the interference estimator, one or more interference cancellation signals to reduce interference within the receive signal based on the first and second adapted filter weights.

16. The interference cancellation method of claim 15, further comprising:
canceling or suppressing, by a subtractor, the interference within the receive signal based on the one or more interference cancellation signals.

17. The interference cancellation method of claim 15, further comprising:
orthogonally transforming the first and the second kernels to generate first and second orthogonal kernels, and wherein first and second filter weights are adapted based on the first and the second orthogonal kernels.

18. The interference cancellation method of claim 17, wherein the performing one or more cascade estimations comprises:
performing one or more recursive linear square (RLS) estimations based on the first and the second orthogonal kernels.

19. The interference cancellation method of claim 15, wherein the performing one or more cascade estimations comprises:
performing one or more recursive linear square (RLS) estimations based on the first and the second kernels.

20. A computer program product embodied on a non-transitory computer-readable medium comprising program instructions configured such that when executed by processing circuitry cause the processing circuitry to implement the method of claim 15.

21. A wireless communication device, comprising:
transmitting means for transmitting a transmit signal;
receiving means for receiving a receive signal; and
interference estimation means for:
generating a first kernel including a first mapping function of the transmit signal and a second kernel including a second mapping function of the transmit signal, the second mapping function being different from the first mapping function;
performing one or more cascade estimations, for a first portion of the transmit signal using the first kernel and for a following second portion of the transmit signal using both the first kernel and the second kernel, to adapt a first filter weight of a set of filter weights based on the first kernel for the first portion of the transmit signal, and to adapt the first filter weight and a second filter weight of the set of filter weights based on the first and the second kernels for the second portion of the transmit signal; and
generating one or more interference cancellation signals to reduce interference within the receive signal based on the first and second adapted filter weights.

22. The wireless communication device of claim 21, wherein the interference estimation means are further configured for:
orthogonally transforming the first and the second kernels to generate first and second orthogonal kernels, wherein the one or more cascade estimations are one or more recursive linear square (RLS) estimations based on the first and the second orthogonal kernels.

* * * * *